United States Patent [19]

Roos et al.

[11] Patent Number: 4,707,022

[45] Date of Patent: Nov. 17, 1987

[54] SLIDING ROOF FOR AN AUTOMOBILE

[75] Inventors: Rudolf Roos, Maintal; Albert Schlapp, Dreieich; Dieter Federmann, Hanau, all of Fed. Rep. of Germany

[73] Assignee: Rockwell-Golde G.m.b.H., Fed. Rep. of Germany

[21] Appl. No.: 902,982

[22] Filed: Sep. 2, 1986

[30] Foreign Application Priority Data

Sep. 11, 1985 [DE] Fed. Rep. of Germany ....... 3532318

[51] Int. Cl.⁴ .............................................. B60J 7/053
[52] U.S. Cl. .................................... 296/222; 296/214; 296/216
[58] Field of Search ......... 296/211, 214, 216, 220–223

[56] References Cited

U.S. PATENT DOCUMENTS 3,960,404 6/1976 Bienert .............................. 296/221 X
4,272,122 6/1981 Schatzler et al. ................... 296/221

FOREIGN PATENT DOCUMENTS 1230683 12/1966 Fed. Rep. of Germany ...... 296/222
2309319 10/1973 Fed. Rep. of Germany ...... 296/223
3442615 5/1986 Fed. Rep. of Germany ...... 296/221
  93620  6/1983 Japan ................................. 296/221
  89223  5/1984 Japan ................................. 296/216

Primary Examiner—Dennis H. Pedder

[57] ABSTRACT

In a sliding roof for an automobile, a rigid sliding lid is slidably guided on lateral guide rails, a movable lid liner participating in the lid displacements being connected to the sliding lid, which liner is likewise displaceable on the guide rails. In order to achieve a step-free, flush joint of the lid liner, when the sliding lid is closed, with a surrounding fixed roof liner, and to avoid damage to the movable lid liner during sliding, the sliding lid and lid liner are connected to each other by guide elements, positively controlled by the lifting movements of the sliding lid, which guide elements during lowering movements of the sliding lid simultaneously raise the lid liner and, during raising of the sliding lid into its closed position, simultaneously lower the lid liner until it lies flush with the fixed liner.

4 Claims, 6 Drawing Figures

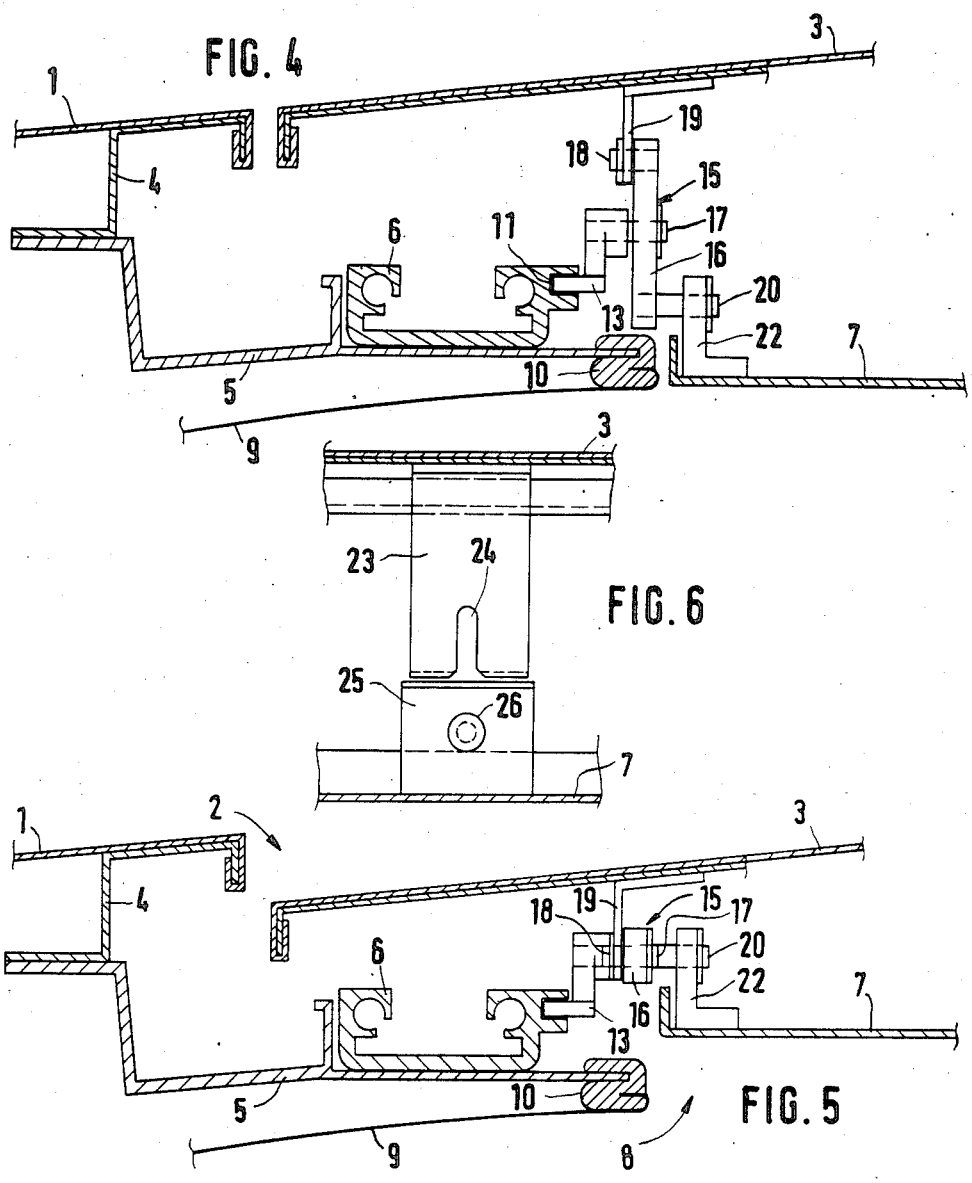

4,707,022

SLIDING ROOF FOR AN AUTOMOBILE

FIELD OF THE INVENTION

This invention relates to a sliding roof for an automobile.

In this specification, the term "sliding roof" is intended to include so-called sliding-lifting roofs, i.e. roofs in which the sliding lid can also be raised above the fixed roof surface in the manner of a forwardly-hinged ventilation flap by raising the rear edge of the lid.

DESCRIPTION OF THE PRIOR ART

In a known sliding roof construction, the sliding roof includes a rigid sliding lid, which is slidably guided in an automobile roof opening on lateral guide rails, which lid is slidable beneath a rear, fixed, automobile roof surface after a lowering movement starting from its closed position. The lid is accompanied by a lid liner, which is connected to it and is likewise slidably guided on the guide rails. This movable liner closes an opening in a fixed liner in the closed position of the moveable liner and the lid, starting from an open position, can be moved with the movable lid liner into its closed position. In such a known construction, the lid liner is always situated above the opening in the fixed liner and engages over this opening, so that the fixed liner forms, along the edges of the opening in fhe fixed liner, a peripheral step which, if viewed when the sliding roof is closed, terminates approximately at a recessed surface of the movable lid liner.

This step is frequently regarded as a nuisance. Furthermore, in the known sliding roof construction, the movable lid liner rests upon a connecting profile surrounding the opening in the fixed liner, which constitutes the connection of the fixed liner to the edge of a sliding roof frame which is usually provided and frames the fixed liner opening. Due to the resting of the movable lid liner on the connecting profile, scratch marks and stains of the movable lid liner occur as a result of the sliding movements.

SUMMARY OF THE INVENTION

According to the present invention, there is provided a sliding roof for an automobile, the roof comprising a rigid sliding lid, lateral guide rails, the sliding lid being slidably guided on said lateral guide rails so as to be slidable beneath a rear, fixed automobile roof surface after having performed a lowering movement starting from its closed position, a movable lid liner connected to the lid, guide elements slidably guiding said movable lid liner on said guide rails and a fixed roof liner; said guide elements of said movable lid liner being connected with the sliding lid or a component connected therewith in such a manner that a height spacing between the sliding lid and the movable lid liner is largest in the closed position of the lid and smallest after said lowering movement, and said movable lid liner, in its closed position, closing an opening in and being flush with said fixed roof liner.

The movable lid liner is, therefore, so-to-speak, mounted in a liftingly movable fashion on the sliding lid and is simultaneously displaced with the sliding lid during lowering and raising movements thereof, but in each case in a direction opposite to the upwards or downwards direction of movement of the sliding lid. In the closed position of the sliding roof, the surface of the movable lid liner lies flush with the surrounding surface of the fixed liner, so that a virtually closed, smooth liner surface is obtained. The position in height of the movable lid liner when the sliding lid is lowered is preferably so arranged that the lid liner is situated free of contact above a connecting profile, if present, and therefore cannot grind or rub on this profile during sliding movements. The present construction is especially suitable for those sliding roof constructions in which, either the sliding lid itself or a component connected therewith, for example an intermediate frame mounted between sliding lid and sliding roof frame, is mounted in a liftingly movable fashion, i.e. can be displaced parallel to the closed position of the lid.

The guide elements can be constructed in the manner of a threaded spindle having a right-hand and left-hand thread, as slide block-slit assemblies or as other splaying devices. In one preferred form of embodiment provision is made, however, that the guide elements shall each possess a two-armed lever, which is pivotally mounted on a guide shoe engaging into the associated guide rail, is connected by an end of one arm thereof with the movable lid liner and by the end of its other arm with the sliding lid or a component connected therewith, in each case by an articulation, of which one is constructed as a sliding hinge. The sliding lid or the component connected therewith is arranged to be displaced in a non-tilting manner during lowering movement and during the oppositely directed movement.

The provision of a two-armed lever at each of the guide elements permits a very simple and low-friction construction, which in upwards and downwards sliding lid movements automatically causes consequential movements of the movable lid liner and by means of which also considerable displacement movements for the movable lid liner are made possible.

With advantage, the arrangement is such that four guide elements are provided, each having a two-armed lever which is pivotal in a vertical plane which in situ is orientated substantially parallel to a longitudinal central plane of the automobile.

An intrinsically rigid construction of sliding lid can be facilitated by forming the lid liner with upwardly orientated edges on all four sides in the manner of a dish, the guide elements engaging, in the vicinity of two of these edges, on the movable lid liner.

For maintaining a defined relative position between sliding lid and movable lid liner, provision can be made for entraining elements to be fixed, on the one hand to the sliding lid and on the other hand to the movable lid liner, which elements are constructed for preventing relative sliding between sliding lid and lid liner and facilitating relative adjusting displacements in height between these components.

With a sliding-lifting roof construction, it is appropriate to provide a ventilating damper in the movable lid liner which remains within the fixed liner opening when the sliding lid is raised above the roof surface, which damper is open when the sliding lid is raised and communicates with the air gap between the rear edge of the sliding lid and the rear edge of the roof opening.

BRIEF DESCRIPTION OF THE DRAWINGS

For a better understanding of the invention, and to show how the same may be carried into effect, reference will now be made, by way of example, to the accompanying drawing, in which:

FIG. 4 is a cut-off sectional view taken along the line IV—IV in FIG. 2, FIG. 5 is a cut-off sectional view taken along the line V—V in FIG. 3, and FIG. 6 is an elevation of entraining elements shown in the direction of arrow VI in FIG. 2.

DETAILED DESCRIPTION OF THE PREFERRED EMBODIMENTS

Figure 1:
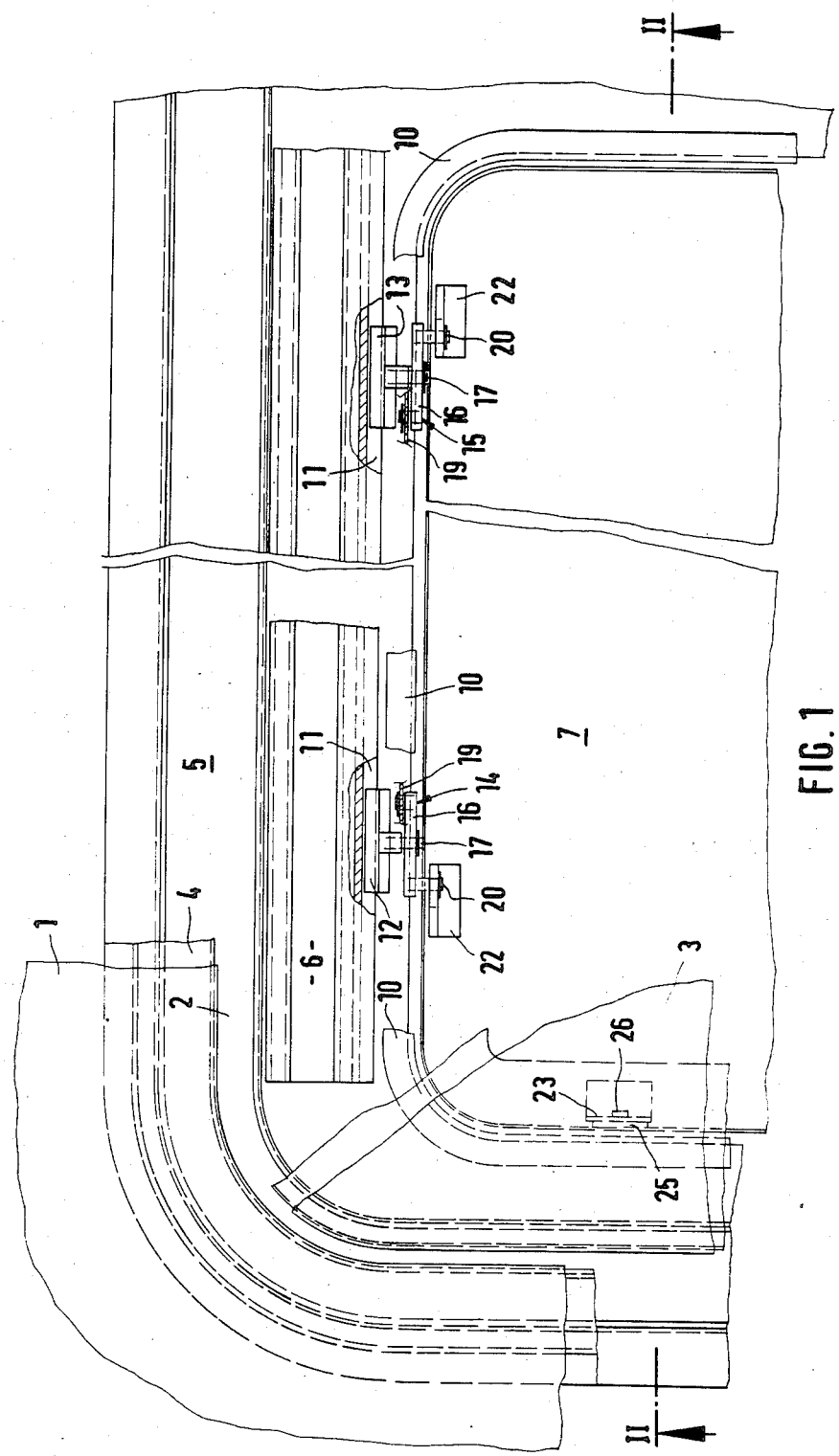
FIG. 1 is a partly cut-away plan view of the right-hand side of a sliding roof.
Figure 2:
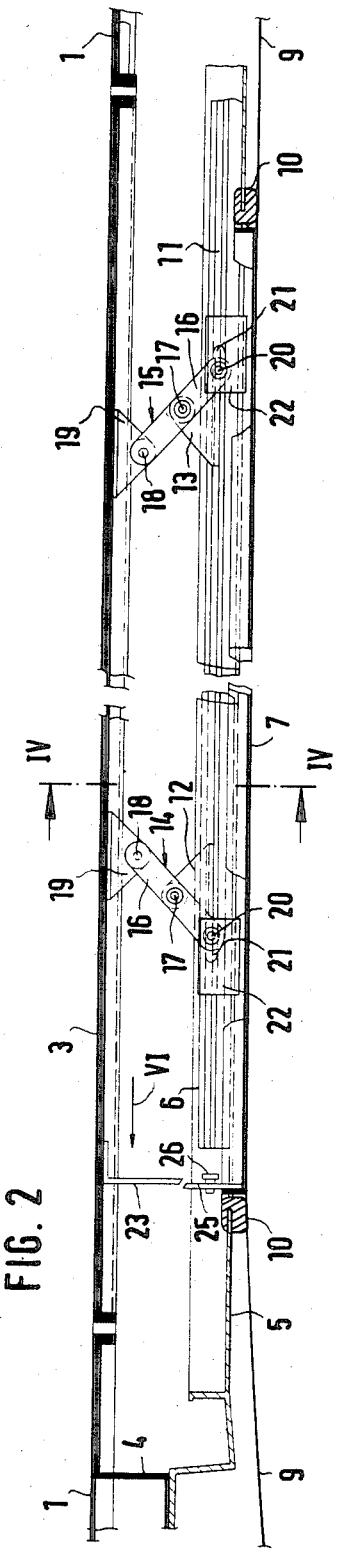
FIG. 2 is a cut-off sectional view taken along the line II—II in FIG. 1 and shows the sliding lid closed.
Figure 3:
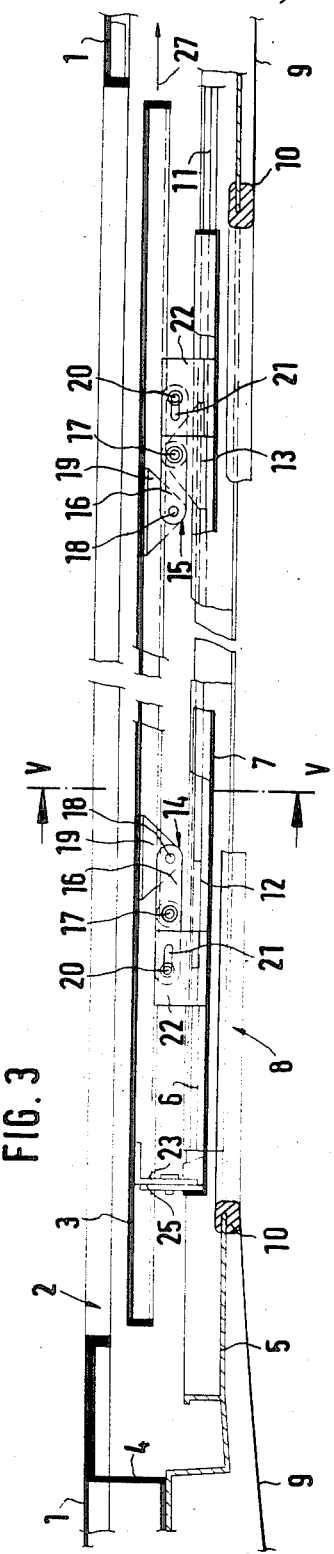
FIG. 3 is a section corresponding to FIG. 2, but shows the sliding lid lowered.

The drawings show a rigid sliding lid 3 associated with a roof opening 2 (FIG. 3) provided in a fixed roof surface 1 of a car or automobile. The sliding lid adopts the position shown in FIGS. 1 and 2 when the roof is closed. The roof opening 2 is framed at its front and sides by a reinforcing frame 4, to which a sliding roof frame 5 is fixed. The roof frame 5 has two lateral frame components at each of which is a guide rail 6, on which the sliding lid 3 is slidably guided by means of front and rear sliding elements (not illustrated). The elements provided for hand or electric motor drive of the sliding roof are also not shown in the drawings, because the invention is not concerned with their construction and mounting. As FIG. 3 illustrates, however, in the case of the sliding roof construction according to this example of embodiment, there is a sliding roof having a liftingly mounted and driven sliding lid 3 which, starting from its closed position shown in FIG. 2, is first lowered in parallel movement into the lowered position illustrated in FIG. 3 before sliding beneath the rear, fixed roof surface 1.

A movable lid liner 7 is connected with the sliding lid 3, in a manner to be described later. The liner 7, in the closed position of the sliding roof illustrated in FIG. 2, fills an opening 8 (FIG. 3) in a fixed liner 9 and lies flush without any step on its lower face with the fixed liner 9, so that a smooth, step-free and generally closed roof liner faces towards the interior of the automobile.

The fixed liner opening 8 is bounded by the four internal peripheral edges of the sliding roof frame 5, onto which a peripheral connecting profile 10 is pushed, which makes the connection with the fixed liner 9. The connecting situation between fixed liner 9 and sliding roof frame 5 is in any case so constructed that, with the sliding roof closed, a flush position between fixed liner 9 and lid liner 7 is obtained.

To explain the connection between sliding lid 3 and lid liner 7, reference will now be made to FIGS. 4 and 5. As with FIGS. 1 to 3, only the sliding roof construction on the right-hand side in respect of the intended direction of forwards vehicle movement is illustrated. The left-hand side is constructed to the opposite hand, so that only the one side is needed to be described below.

Each guide rail 6 possesses, in addition to its internal channels for guiding the drive and guide elements of the sliding lid, a guide channel 11 which is open towards the fixed liner opening 8, in which a front guide shoe 12 and rear guide shoe 13, which are not connected together, slidably engage. The front and rear guide shoes 12, 13 are components of front and rear guide elements 14, 15 respectively. In the example illustrated, the front and rear guide elements 14, 15 are of identical construction in all parts, where necessary to opposite hand.

Each guide element 14, 15 includes a two-armed lever 16, which is pivotally journalled by a bearing journal 17 on the forward and rear guide shoes 12, 13, respectively. Each two-armed lever 16 is articulated by the end of one of its arms via a bearing pin 18 on a bearing block 19, fixed to the sliding lid 3. The end of the other arm of each two-armed lever 16 engages displaceably and pivotally by a guide pin 20 in a guide slit 21 of a support member 22, firmly connected with the movable lid liner 7. The guide pins 20 and the guide slits 21 constitute, in each pair, a sliding hinge for the length compensation necessary in the pivoting of the two-armed levers 16.

In addition to the four guide elements, consisting of two front guide elements 14 and two rear guide elements 15, entraining elements are disposed between the sliding lid 3 and lid liner 7, which elements can be seen in FIGS. 1 to 3 and 6. The entraining elements, which for example may be provided on the front edge of the lid liner 7 at both sides in a corresponding arrangement, each consist of a downwardly pointing lug 23, fixed to the sliding lid 3 and having a downwardly open slit 24, and of an upwardly pointing counter-lug 25, fixed to the lid liner 7 and having a stud bolt 26 provided for guided seating in the slit 24. The entraining elements constructed in this way ensure that, on the one hand, relative displacements between the sliding lid 3 and the lid liner 7 in the displacement directions of the sliding lid 3 are prevented, but that relative movements between sliding lid 3 and lid liner 7 in the vertical direction are possible.

The lid liner 7 possesses, at all four sides, upwardly orientated cranked edges and is thus constructed generally dish-shaped and self-supporting. It can be made from sheet metal or plastics, and may either be adapted to the colouring of the fixed liner or covered with the material of the fixed liner. The four supporting members, on which the guide elements 14, 15 act, are fixed to the lid liner 7 in the vicinity of the two lateral cranked edges. The lateral cranked edges may be so constructed, at least in the region of the guide elements 14, 15, that the two-armed levers 16 of the guide elements act directly with their guide pins 20 on the cranked edges.

If the sliding lid 3, starting from its closed position illustrated in FIGS. 2 and 4, is first lowered by the drive means, not shown, into the position illustrated in FIGS. 3 and 5 in order to initiate its opening displacement, then the two-armed levers 16 pivot about the bearing journals 17, because the bearing pins 18 together with the bearing blocks 19 move downwards with the sliding lid 3. Due to the two-armed system, the guide pins 20 move upwards, pivoting in the guide slits 21 and simultaneously sliding therein. Consequently, the support members 22 and therefore the lid liner firmly fixed to them are displaced out of the fixed liner opening 8 upwards into the position shown in FIGS. 3 and 5. In this movement, the guide shoes 12, 13 also displace outwards, i.e. with an increasing distance between them, on account of the necessary pivot length adjustment at the two-arm levers 16.

When the sliding lid 3 has been fully lowered out of its roof opening 2 and the lid liner 7 fully displaced upwards above the connecting profile 10, the sliding lid 3 and lid liner 7 are in the substantially parallel position illustrated in FIG. 3 and are now displaced, if the drive action on the sliding lid is continued, jointly in this orientation backwards and beneath the fixed roof surface 1 in the direction of the arrow 27 shown in FIG. 3. Entrainment during sliding is provided by the entraining elements, consisting of the lugs 23 and counter-lugs 25, which in the lowering movement of the sliding lid 3 and simultaneous lifting movement of the lid liner 7 come into engagement by the stud bolts 26 and the associated slits 24.

It can be seen that during sliding of the lid liner 7 backwards, no grinding contact takes place with components of the roof construction, not even with the connecting profile 10, so that the lid liner 7 cannot be damaged. If the sliding lid 3 is displaced from an open position back into its closed position, i.e. in a direction opposite to arrow 27, then once again the lid liner 7 is positively entrained with it until the sliding lid 3 reaches a defined limiting position determined by its drive elements, which is the same as the position of the components shown in FIG. 3. If the closing drive is continued, the sliding lid 3 is now moved parallel to its position illustrated, and upwards into the position shown in FIG. 2. At the same time, the lid liner 7 is moved downwards by means of the guide elements 14, 15, until finally it again adopts its flush position with the surrounding fixed roof liner 9. FIGS. 2 and 3 illustrate that the distance in height between sliding lid and lid liner is largest in the closed position and is smallest immediately after the lowering movement.

The four guide elements are so orientated relative to one another that their two-armed levers 16 are pivotable in vertical planes which are orientated parallel to the longitudinal central plane of the automobile.

It is possible for differently constructed lifting elements to be provided between the sliding lid 3 and the movable lid liner 7, so long as these merely ensure that lifting movements of the sliding lid 3 are transmitted in the opposite direction of movement onto the lid liner 7. The arrangement illustrated and described of twoarmed levers permits, however, an especially simple and low-friction construction of the guide elements. The additional movement of the lid liner 7 caused by the movement of the sliding lid 3 therefore takes place with easy running and without detectable increase of the forces necessary for the sliding roof drive.

We claim:

1. In a sliding roof for an automobile having a rigid sliding lid and lateral guide rails on which said rigid lid is slidably guided beneath a fixed automobile roof surface, that improvement consisting of:
    a movable lid liner connected to said rigid sliding lid which participates with said sliding lid in opening, lifting, lowering, and closing movements of said rigid sliding lid;
    guide elements for slidably guiding said movable lid liner on said lateral guide rails responsive to said opening and closing movements of said rigid sliding lid; and
    said guide elements each comprising a two-armed lever and a guide shoe in which said two-armed lever is pivotally mounted and in which one end of said lever is pivotally connected to said movable lid liner by articulation means and the other end of such lever is pivotally connected to said sliding lid, said guide elements during said lowering movement of the rigid lid simultaneously raise the lid liner, and during said lifting movement simultaneously lower the lid liner.

2. A sliding roof as claimed in claim 1 wherein said articulation means is constructed as a sliding hinge and said sliding lid is displaceable in a non-tilting manner during said lowering and lifting movements.

3. A sliding roof as claimed in claim 1 wherein the number of guide elements is four and wherein each of said twoarmed levers is pivoted in a vertical plane which is substantially parallel to a longitudinal central plane of the automobile.

4. A sliding roof as claimed in claim 1 including entraining elements fixed to said sliding lid and to said movable lid liner to prevent relative sliding movement between said lid and lid liner during said opening and closing movements.

* * * * *